(12) United States Patent
Lee et al.

(10) Patent No.: US 10,911,905 B2
(45) Date of Patent: Feb. 2, 2021

(54) AVOIDING EMBMS CONCURRENCY WITH PAGING IN NB-IOT AND EMTC

(71) Applicants: QUALCOMM INCORPORATED, San Diego, CA (US); Kuo-Chun Lee, San Diego, CA (US); Sivaramakrishna Veerepalli, San Diego, CA (US); Liangchi Hsu, San Diego, CA (US); Suli Zhao, San Diego, CA (US); Chun-Hao Hsu, San Jose, CA (US); Ralph Akram Gholmieh, San Diego, CA (US); Xipeng Zhu, San Diego, CA (US)

(72) Inventors: Kuo-Chun Lee, San Diego, CA (US); Sivaramakrishna Veerepalli, San Diego, CA (US); Liangchi Hsu, San Diego, CA (US); Suli Zhao, San Diego, CA (US); Chun-Hao Hsu, San Jose, CA (US); Ralph Akram Gholmieh, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/345,602

(22) PCT Filed: Nov. 11, 2016

(86) PCT No.: PCT/CN2016/105449
§ 371 (c)(1),
(2) Date: Apr. 26, 2019

(87) PCT Pub. No.: WO2018/086062
PCT Pub. Date: May 17, 2018

(65) Prior Publication Data
US 2019/0342722 A1  Nov. 7, 2019

(51) Int. Cl.
*G01R 31/08* (2020.01)
*G06F 11/00* (2006.01)
(Continued)

(52) U.S. Cl.
CPC .............. *H04W 4/06* (2013.01); *H04W 4/029* (2018.02); *H04W 4/70* (2018.02); *H04W 4/80* (2018.02);
(Continued)

(58) Field of Classification Search
CPC ......... H04W 4/06; H04W 4/70; H04W 76/28; H04W 4/029; H04W 4/80; H04W 76/40; H04W 16/26; H04W 60/00; H04W 68/005
See application file for complete search history.

(56) References Cited

U.S. PATENT DOCUMENTS

2004/0142706 A1* 7/2004 Kim ...................... H04W 68/02
                                                                 455/458
2004/0152473 A1* 8/2004 Kuwano ............... H04W 76/40
                                                                 455/456.2
(Continued)

FOREIGN PATENT DOCUMENTS

| CN | 101820687 A | 9/2010 |
| CN | 105284170 A | 1/2016 |
| EP | 3001746 A1 | 3/2016 |

OTHER PUBLICATIONS

International Search Report and Written Opinion for PCT/CN2016/105449, dated Apr. 12, 2017.
(Continued)

*Primary Examiner* — Stephen M D Agosta
(74) *Attorney, Agent, or Firm* — Patterson & Sheridan, L.L.P.

(57) ABSTRACT

Certain aspects of the present disclosure relate to methods and apparatus for avoiding conflicts between evolved Mul-
(Continued)

timedia Broadcast Multicast Services (eMBMS) operations and paging and/or mobile originated (MO) operations in communication systems. A method for wireless communications by a user Equipment (UE) is provided. The method generally includes identifying at least one evolved Multimedia Broadcast Multicast Service (eMBMS) session available for receiving one or more eMBMS services from a base station. The method also includes taking one or more actions to reduce a conflict between receiving the one or more eMBMS services from the base station and receiving a paging message from the base station during the eMBMS session. Numerous other aspects are provided.

20 Claims, 15 Drawing Sheets

(51) Int. Cl.
| | |
|---|---|
| *G08C 15/00* | (2006.01) |
| *H04J 1/16* | (2006.01) |
| *H04J 3/14* | (2006.01) |
| *H04L 12/26* | (2006.01) |
| *H04W 4/06* | (2009.01) |
| *H04W 4/70* | (2018.01) |
| *H04W 76/28* | (2018.01) |
| *H04W 4/029* | (2018.01) |
| *H04W 4/80* | (2018.01) |
| *H04W 76/40* | (2018.01) |
| *H04W 16/26* | (2009.01) |
| *H04W 60/00* | (2009.01) |
| *H04W 68/00* | (2009.01) |

(52) U.S. Cl.
CPC ........... *H04W 16/26* (2013.01); *H04W 60/00* (2013.01); *H04W 68/005* (2013.01); *H04W 76/28* (2018.02); *H04W 76/40* (2018.02)

(56) References Cited

U.S. PATENT DOCUMENTS

| | | | | |
|---|---|---|---|---|
| 2005/0153715 A1* | 7/2005 | Hwang | ............... | H04W 68/025 455/458 |
| 2005/0233732 A1* | 10/2005 | Kwak | ................... | H04W 68/00 455/414.1 |
| 2007/0124774 A1* | 5/2007 | Roberts | ............. | H04W 52/0216 725/62 |
| 2010/0285826 A1* | 11/2010 | Bourdeaut | ............ | H04L 1/0003 455/513 |
| 2011/0310854 A1* | 12/2011 | Zou | ................... | H04W 74/0891 370/336 |
| 2016/0105894 A1 | 4/2016 | Lu et al. | | |
| 2016/0192294 A1* | 6/2016 | Panchal | .................. | H04W 4/06 370/311 |
| 2016/0381588 A1* | 12/2016 | Strobl | ................... | H04W 24/10 455/67.11 |
| 2017/0041960 A1* | 2/2017 | Quan | ................ | H04W 74/0833 |
| 2017/0094669 A1* | 3/2017 | Chandwani | ......... | H04W 72/005 |
| 2017/0332350 A1* | 11/2017 | Paredes Cabrera | .......................... | H04W 72/005 |
| 2018/0103427 A1* | 4/2018 | Griot | ................. | H04W 52/0216 |

OTHER PUBLICATIONS

Huawei (Rapporteur): "Introduction of NB-IoT"; 3GPP TSG-RAN WG2 Meeting#93, 3GPP Draft; 36300_CR0844_(REL-13)_R2-161604, 36.300 Introduction-of NB-IOT J 3rd Generation Partnership Project (3GPP), Mobile Competence Centre ; 650J Route Des Lucioles ; F-06921 Sophia-Antipolis Cede, vol. RAN WG2, No. St Julian's, Malta; Feb. 15, 2016-Feb. 19, 2016, Feb. 19, 2016 (Feb. 19, 2016), 278 Pages, XP051066037, Retrieved from the Internet: URL:http://www.3gpp.org/ftp/tst_ran/WG2_RL2/TSGR2_93/.

Nokia, et al., "On Multicast Support for NB-IoT"; 3GPP TSG RAN WG1 Meeting#86, 3GPP Draft; R1-166591, 3rd Generation Partnership Project (3GPP), Mobile Competence Centre ; 650 Route Des Lucioles ; F-06921 Sophia-Antipolis Cedex; France, vol. RAN WG1, No. Gothenburg, Sweden; Aug. 22, 2016-Aug. 26, 2016,Aug. 21, 2016 (Aug. 21, 2016), 2 Pages, XP051125462, Retrieved from the Internet: URL:http://www.3gpp.org/ftp/Meetings_3GPP_SYNC/RAN1/Docs/ [retrieved on Aug. 21, 2016].

Supplementary European Search Report—EP16921001—Search Authority—Munich—dated Feb. 26, 2020.

* cited by examiner

AVOIDING EMBMS CONCURRENCY WITH PAGING IN NB-IOT AND EMTC

CROSS-REFERENCE TO RELATED APPLICATION

This application is a national stage application under 35 U.S.C. 371 of PCT/CN2016/105449, filed Nov. 11, 2016, which assigned to the assignee of the present application and expressly incorporated by reference in its entirety.

BACKGROUND

Field of the Disclosure

The present disclosure relates generally to communication systems, and more particularly, to techniques for avoiding conflicts between evolved Multimedia Broadcast Multicast Services (eMBMS) operations and paging operations in communication systems, such as enhanced machine type communication(s) (eMTC) and/or narrowband internet-of-things (NB-IoT) systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, access point (AP), radio head, transmit receive point (TRP), new radio (NR) BS, 5G Node B, etc.).

Some UEs may be considered machine type communication(s) (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. In general, MTC devices may include a broad class of devices in wireless communications including, but not limited to: Internet of Things (IoT) devices, Internet of Everything (IoE) devices, wearable devices and low cost devices.

Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method for wireless communications that may be performed, for example, by a user equipment (UE). The method generally includes identifying at least one evolved Multimedia Broadcast Multicast Service (eMBMS) session available for receiving one or more eMBMS services from a base station. The method also includes taking one or more actions to reduce a conflict between receiving the one or more eMBMS services from the base station and receiving a paging message from the base station during the eMBMS session.Certain aspects of the present disclosure provide an apparatus for wireless communication. The apparatus includes means for identifying at least one eMBMS session available for receiving one or more eMBMS services from a base station. The apparauts also includes means for taking one or more actions to reduce a conflict between receiving the one or more eMBMS services from the base station and receiving a paging message from the base station during the eMBMS session.

Certain aspects of the present disclosure provide an apparatus for wireless communication. The apparatus includes at least one processor and a memory coupled to the at least one processor. The at least one processor is configured to identify at least one eMBMS session available for receiving one or more eMBMS services from a base station. The at least one processor is also configured to take one or more actions to reduce a conflict between receiving the one or more eMBMS services from the base station and receiving a paging message from the base station during the eMBMS session.

Certain aspects of the present disclosure provide a computer-readable medium having computer executable code stored thereon. The computer executable code includes code for identifying at least one eMBMS session available for receiving one or more eMBMS services from a base station. The computer executable code also includes code for taking one or more actions to reduce a conflict between receiving the one or more eMBMS services from the base station and receiving a paging message from the base station during the eMBMS session.

Aspects generally include methods, apparatus, systems, computer program products, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
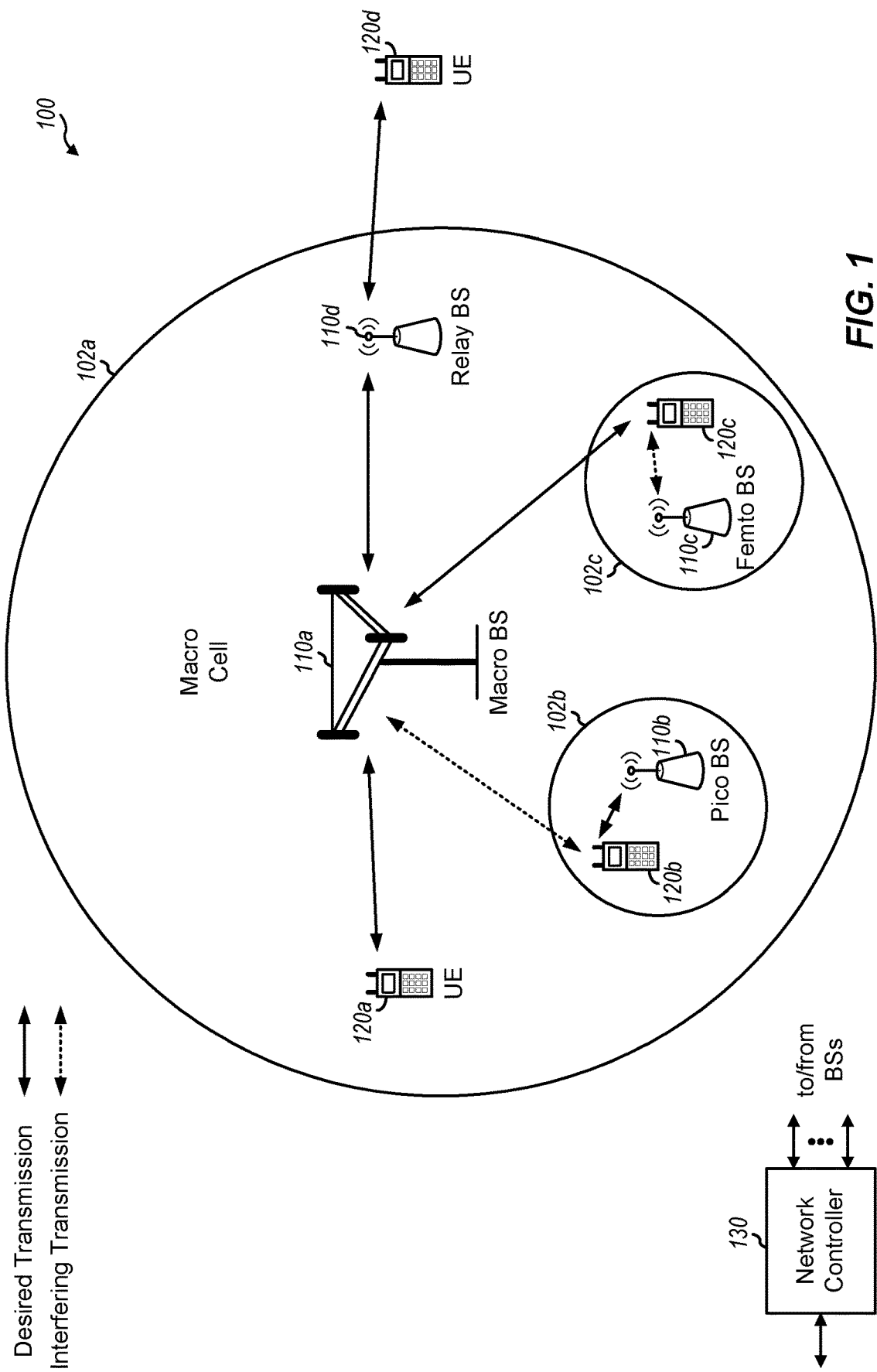
FIG. 1 is a block diagram conceptually illustrating an example of a wireless communication network, in accordance with certain aspects of the present disclosure.

Aspects of the present disclosure provide techniques and apparatus for avoiding conflicts between evolved Multimedia Broadcast Multicast Services (eMBMS) operations and paging operations in communication systems, e.g., such as systems that support eMTC, NB-IoT, etc.

As described in more detail below, a UE may identify at least one evolved Multimedia Broadcast Multicast Service (eMBMS) session available for receiving one or more eMBMS services from a base station. The UE may then take one or more actions to reduce (or avoid) a conflict between receiving the one or more eMBMS services from the base station and receiving a paging message from the base station during the eMBMS session. In one aspect, the one or more actions may include operating in at least one of an extended discontinuous reception (eDRX) or a power saving mode (PSM) for at least a portion of the eMBMS session.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs or evolved MTC (eMTC) devices. MTC and eMTC UEs include, for example, robots, drones, remote devices, sensors, meters, monitors, location tags, etc., that may communicate with a BS, another device (e.g., remote device), or some other entity. MTC devices and/or eMTC devices, as well as other types of devices, may include Internet of Everything (IoE) or Internet of Things (IoT) devices, such as NB-IoT devices, and techniques disclosed herein may be applied to MTC devices, eMTC devices, NB-IoT devices, as well as other devices.

It is noted that while aspects may be described herein using terminology commonly associated with 3G and/or 4G wireless technologies, aspects of the present disclosure can be applied in other generation-based communication systems, such as 5G and later, including NR technologies.

An Example Wireless Communication System

FIG. 1 is a diagram illustrating a wireless network 100 in which aspects of the present disclosure may be practiced. For example, the UE 120 may identify (e.g., based on signaling from a BS 110) at least one evolved Multimedia Broadcast Multicast Service (eMBMS) session available for receiving one or more eMBMS services from the BS 110. Once identified, the UE 120 may then take one or more actions to reduce (or avoid) a conflict between receiving the one or more eMBMS services from the BS 110 and receiving a paging message from the BS 110 during the eMBMS session.

The wireless network 100 may be an LTE network or some other wireless network, such as a NR or 5G network, and/or may support NB-IoT, MTC, eMTC, etc. Wireless network 100 may include a number of BSs 110 and other network entities. A BS is an entity that communicates with user equipments (UEs) and may also be referred to as a base station, eNB, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a,* an BS 110*b* may be a pico BS for a pico cell 102*b,* and a BS 110*c* may be a femto BS for a femto cell 102*c.* A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment, for example, of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 20 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
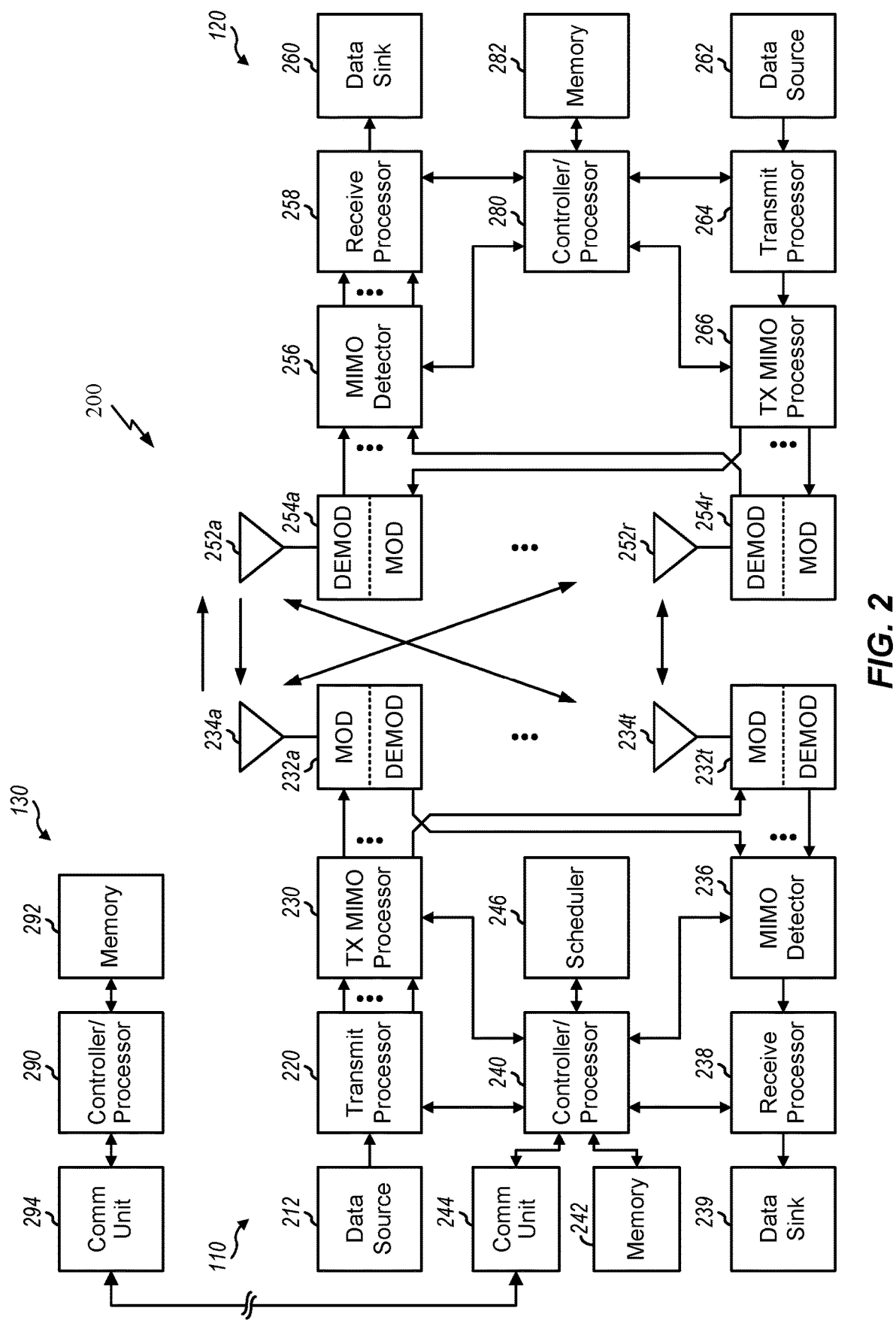
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1. One or more components of the BS 110 and UE 120 may be used to practice aspects of the present disclosure.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform techniques presented herein for avoiding conflicts between evolved Multimedia Broadcast Multicast Services (eMBMS) operations and paging operations in communication systems. For example, controller/processor 280 and/or other controllers/processors and modules at UE 120 may perform or direct operations by the UE in FIG. 13, operations 1600 shown in FIG. 16 and/or other processes for the techniques described herein. The controller/processor 240 and/or other controllers/processors and modules at BS 110 may perform operations by the BS in FIG. 13 and/or other processes for the techniques described herein. Memories 242 and 282 may store data and program codes for base station 110 and UE 120, respectively. A scheduler 246 may schedule UEs for data transmission on the downlink and/or uplink.

Figure 3:
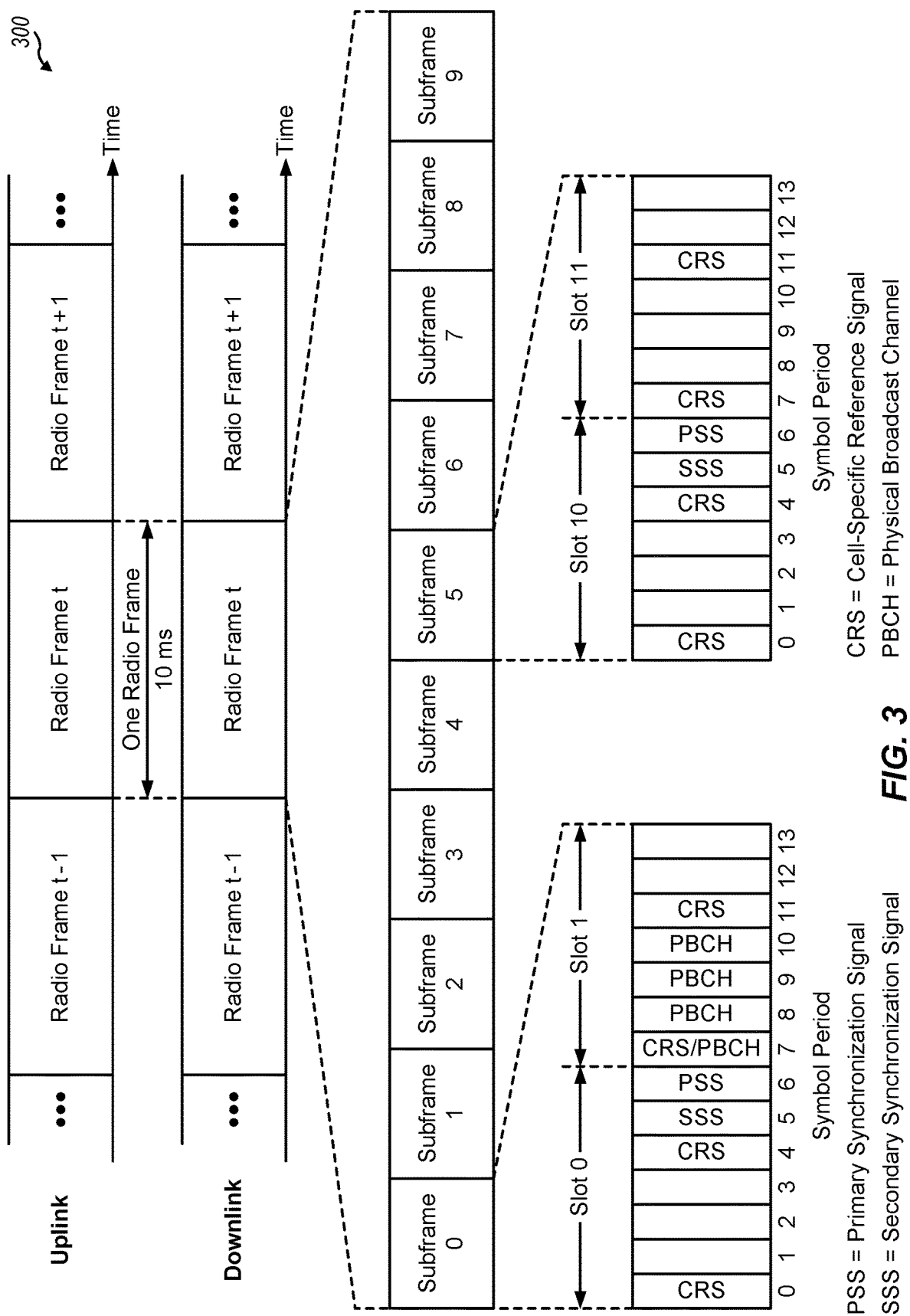
FIG. 3 is a block diagram conceptually illustrating an example of a frame structure in a wireless communications network, in accordance with certain aspects of the present disclosure.

FIG. 3 shows an exemplary frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

Figure 4:
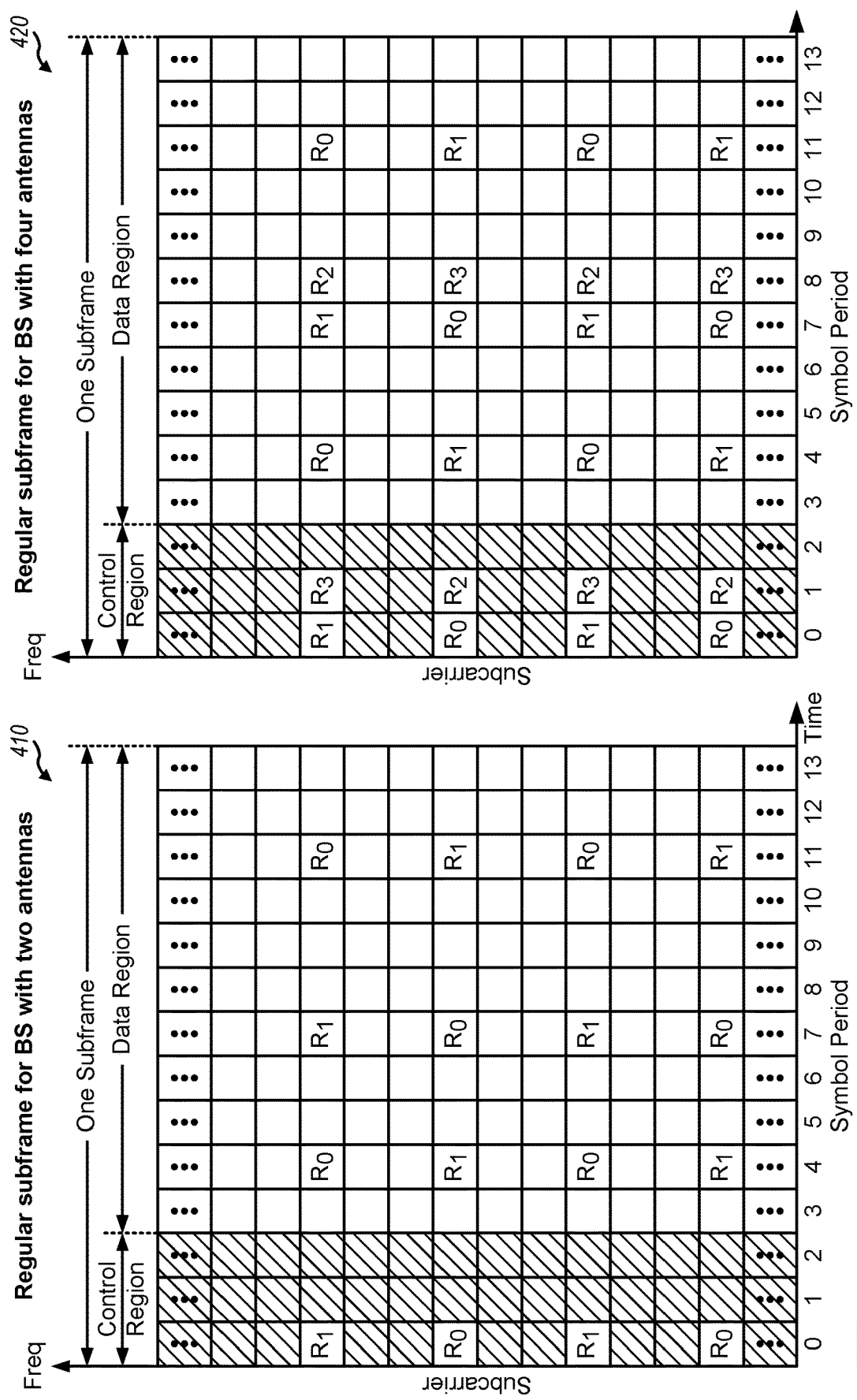
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 5:
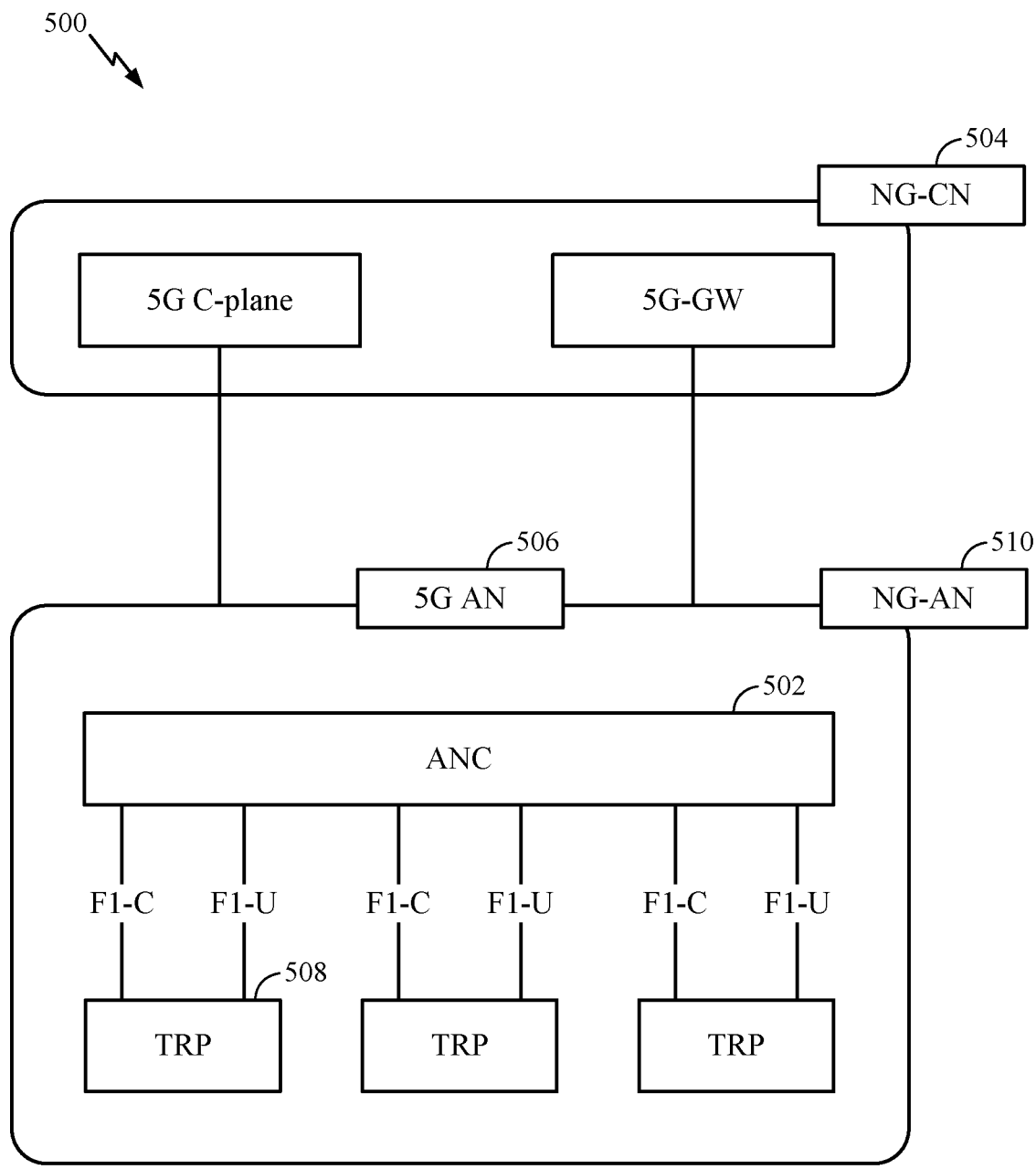
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 500 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture 500. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 508).

Figure 6:
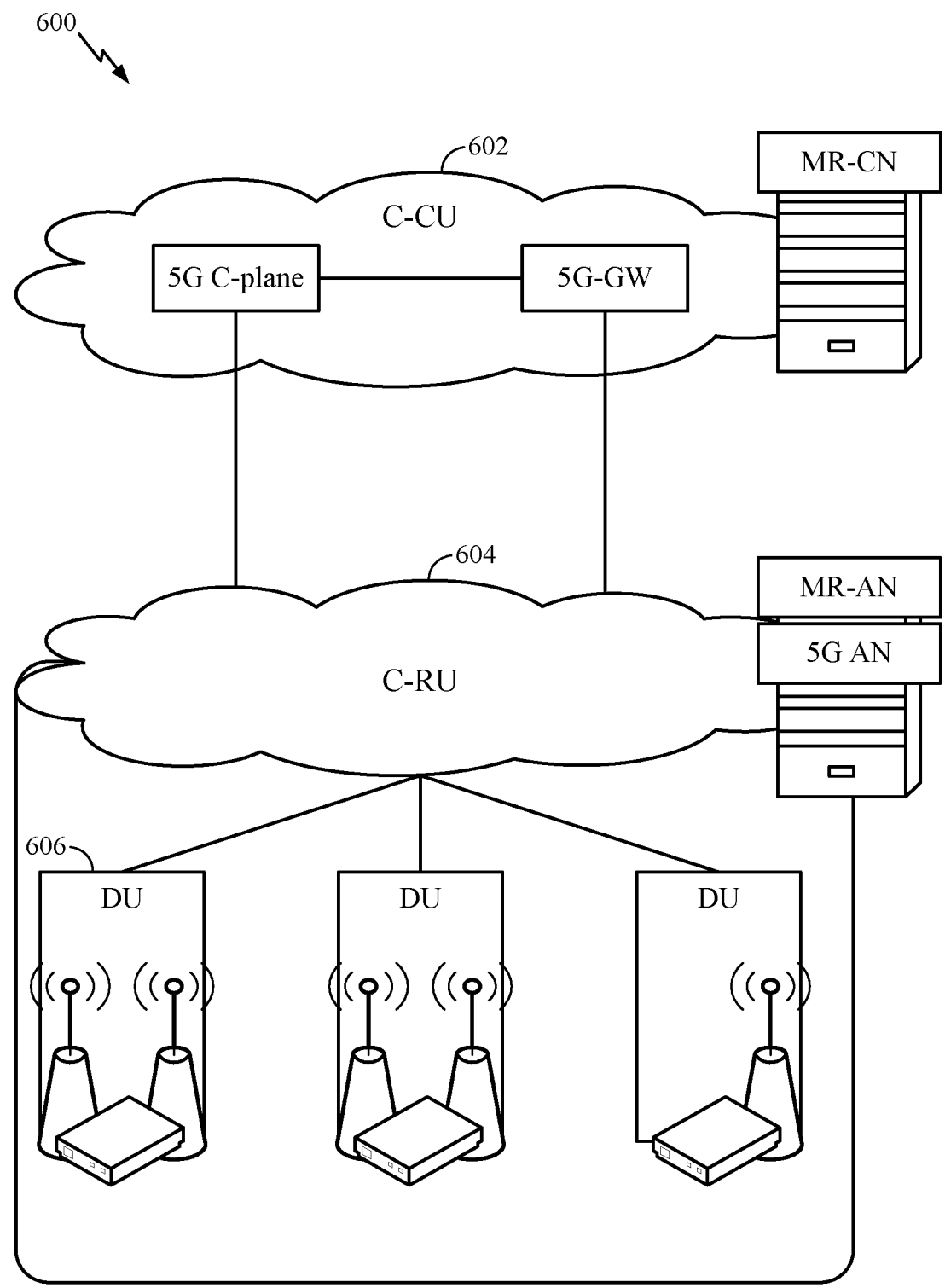
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

Figure 7:
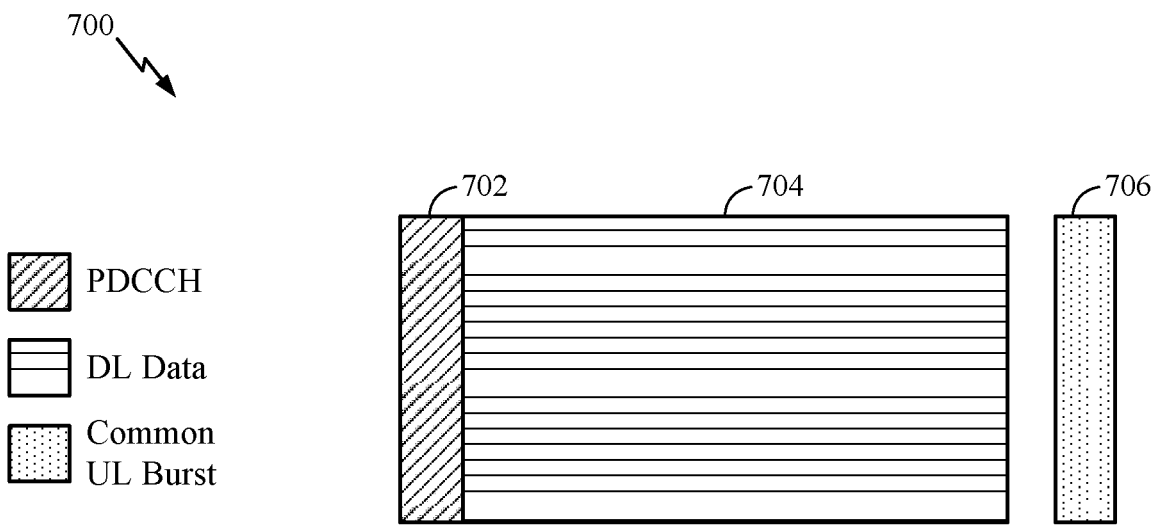
FIG. 7 is a diagram illustrating an example of a downlink (DL)-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 706. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
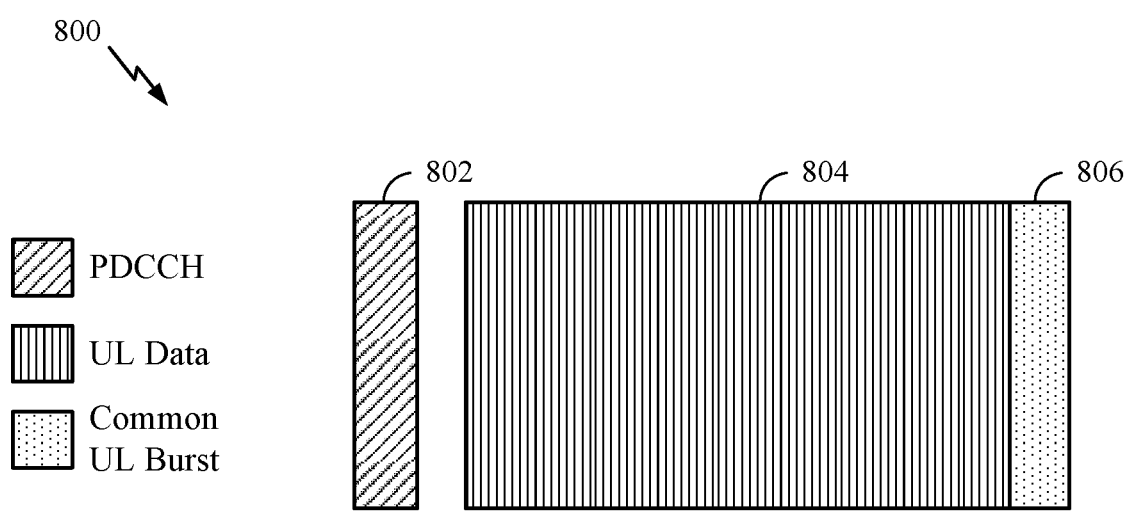
FIG. 8 is a diagram illustrating an example of an uplink (UL)-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical UL shared channel (PUSCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 706 described above with reference to FIG. 7. The common UL portion 806 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (e.g., relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

Certain standards (e.g., LTE Release 13) may introduce support for various additional MTC enhancements, referred to herein as enhanced MTC (or eMTC). For example, eMTC may provide MTC UEs with coverage enhancements up to 20 dB. eMTC UEs may support narrowband operation while operating in a wider system bandwidth (e.g., 1.4/3/5/10//15/20 MHz). Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRBs). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

In the case of NB-IoT, the wireless communication network (e.g., LTE Release 13, or greater) may support deployments using one physical resource block (PRB) (e.g., 180 kHz+20 kHz guard band). NB-IoT deployments may utilize higher layer components of LTE and hardware to allow for reduced fragmentation and cross compatibility with, for example, NB-LTE and eMTC. In one case, NB-IoT may be deployed in-band and coexist with legacy GSM/WCDMA/LTE system(s) deployed in the same frequency band. Wideband LTE channel, for example, may be deployed in various bandwidths between 1.4 MHz to 20 MHz, and there may be a dedicated PRB for use by NB-IoT, or the RBs allocated for NB-IoT may be dynamically allocated (e.g., by an eNB). In an in-band deployment, one PRB, or 180 kHz, of a wideband LTE channel may be used for NB-IoT. In some deployments, NB-IoT may be deployed standalone. In a standalone deployment, one 180 kHz carrier may be used to carry NB-IoT traffic and GSM spectrum may be reused. In some deployments, NB-IoT may be deployed in the unused resource blocks within a LTE carrier guard-band.

NB-IoT may support single-tone and multi-tone assignments. For example, in uplink, 15 kHz or 3.75 kHz tone spacing may be used with single tone allocation or multiple tone allocation. For 15 kHz tone or subcarrier spacing, up to 12 tones or subcarriers can be used in a resource unit with single tone allocation and for 3.75 kHz tone spacing up to 48 tones can be used in a resource unit with single tone allocation.

Example Evolved Multimedia Broadcast Multicast Service

An evolved Multimedia Broadcast and Multicast Service (eMBMS) service area is an area providing one or more eMBMS services. An eMBMS service area may be divided into one or more into one or more Multimedia Broadcast Single Frequency Network (MBSFN) areas. Each MBSFN area typically includes one or more eNBs which may be used for synchronized transmission of the same eMBMS content in the MBSFN area. In certain aspects, an MBSFN area may be used to broadcast different eMBMS services. In certain aspects, the size of an MBSFN area may be as small as one cell.

Figure 9:
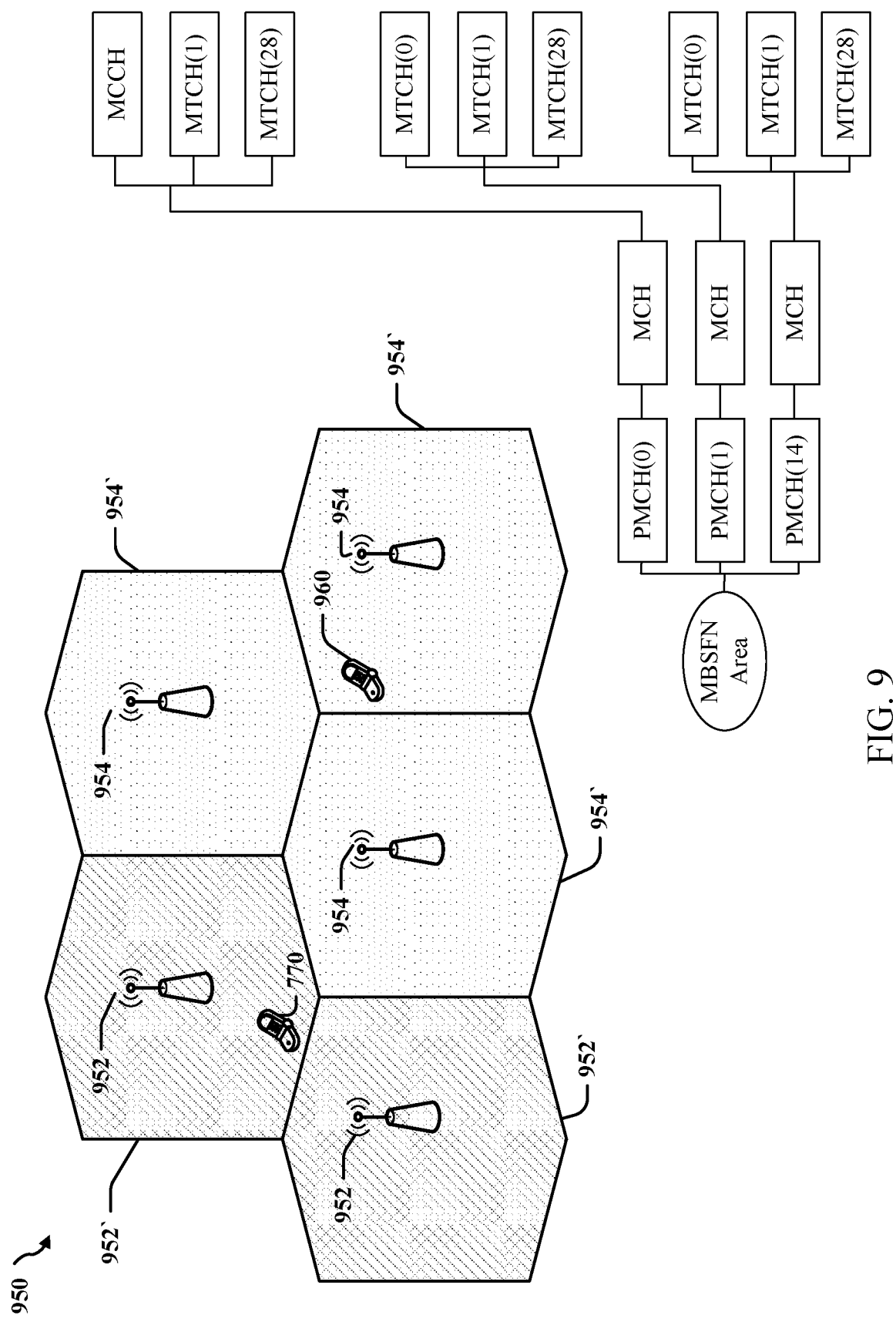
FIG. 9 is a diagram illustrating evolved Multicast Broadcast Multimedia Service (eMBMS) in a Multi-Media Broadcast over a Single Frequency Network.

FIG. 9 is a diagram 950 illustrating evolved Multicast Broadcast Multicast Service (eMBMS) in a Multimedia Broadcast over a Single Frequency Network (MBSFN). The BSs 952 in cells 952' may form a first MBSFN area and the BSs 954 in cells 954' may form a second MBSFN area. The BSs 952, 954 may be associated with other MBSFN areas, for example, up to a total of eight MBSFN areas. A cell within an MBSFN area may be designated a reserved cell. Reserved cells may not provide multicast/broadcast, but may be time-synchronized to the cells 952', 954' and have restricted power on MBSFN resources in order to limit interference to the MBSFN areas.

Each BS in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 9, the first MBSFN area (e.g., BSs 952 in cells 952') may support a first eMBMS broadcast service, such as by providing a particular news broadcast to UE(s) 970. The second MBSFN area (e.g., BSs 954 in cells 954') may support a second eMBMS broadcast service, such as by providing a different news broadcast to UE(s) 960.

Each MBSFN area supports a plurality of physical multicast channels (PMCH) (e.g., 15 PMCHs). Each PMCH corresponds to a multicast channel (MCH). The PMCH is a downlink physical layer channel that carries data (both control and traffic) originating from higher protocol layers for eMBMS. The UE may decode PMCH for any control or traffic eMBMS data. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs. The MCCH carries eMBMS control information and the MTCH carries eMBMS traffic.

Example Power Saving Mode

In Release 12 (e.g., MTC), a power saving mode (PSM) was introduced for certain UEs (e.g., MTC UEs, eMTC UEs, etc.). With PSM, such devices may remain in low power states for much of the time and wake up only occasionally to transmit and/or receive data. For example, in some cases, PSM may allow UEs to sleep (e.g., remain in idle mode) until the time when the UE has to perform a tracking area update (TAU). PSM further defines an extended idle mode interval for monitoring for paging messages from a base station.

Figure 10:
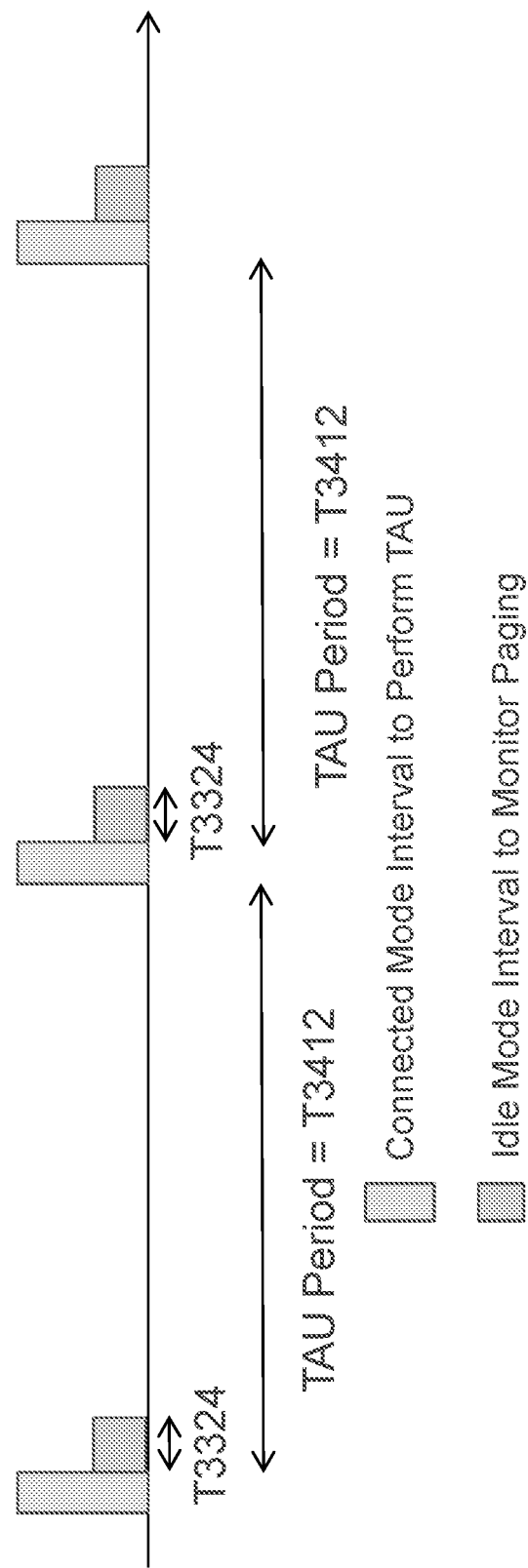
FIG. 10 is a diagram illustrating an example of a UE in power saving mode, in accordance with certain aspects of the present disclosure.

FIG. 10 illustrates one example timeline of a UE operating while configured in PSM, in accordance with certain aspects of the present disclosure. As shown, while operating in PSM, a UE may remain in idle mode for a TAU period. To activate PSM, the UE may include at least a first proposed timer value (e.g., T3324 value IE) and optionally a second proposed timer value (e.g., T3412 extended value IE) in the Attach Request or Tracking Area Update (TAU) Request for the TAU. The PSM may be activated when the network replies with the actual values of the T3324 value IE and/or T3412 extended value IE (e.g., in an Attach Accept message or Tracking Area Update (TAU) Accept message).

The first proposed timer value (T3324) is the time the UE stays in idle mode after the TAU to monitor for paging messages from the base station. The second proposed timer value (T3412) is the time the UE may remain in idle mode until the next TAU. For example, as shown in FIG. 10, after the UE performs a TAU (e.g., in connected mode), the UE may enter an idle mode (or first low power state) for a duration of T3324. While in this idle mode, the UE may monitor for paging messages. Once the T3324 expires, the UE may remain in idle mode (or enter a second low power state that is lower than the first low power state) for a duration of T3412. In some cases, the UE may not monitor for any paging messages or other signaling from the base station for the duration of time between the end of T3324 and end of T3412. In some cases, the value of the T3412 extended value IE requested by the UE can be a multiple of 1 hour or 10 hours, up to 320 hours.

Example Extended Discontinuous Reception (eDRX)

In Release 13, an extended discontinuous reception (eDRX) was introduced to further extend battery life for certain devices (e.g., eMTC devices, NB-IoT devices, etc.). In eDRX, a UE may choose the intervals in which it wants to monitor for paging messages from the base station, and remain inactive during other intervals.

Figure 11:
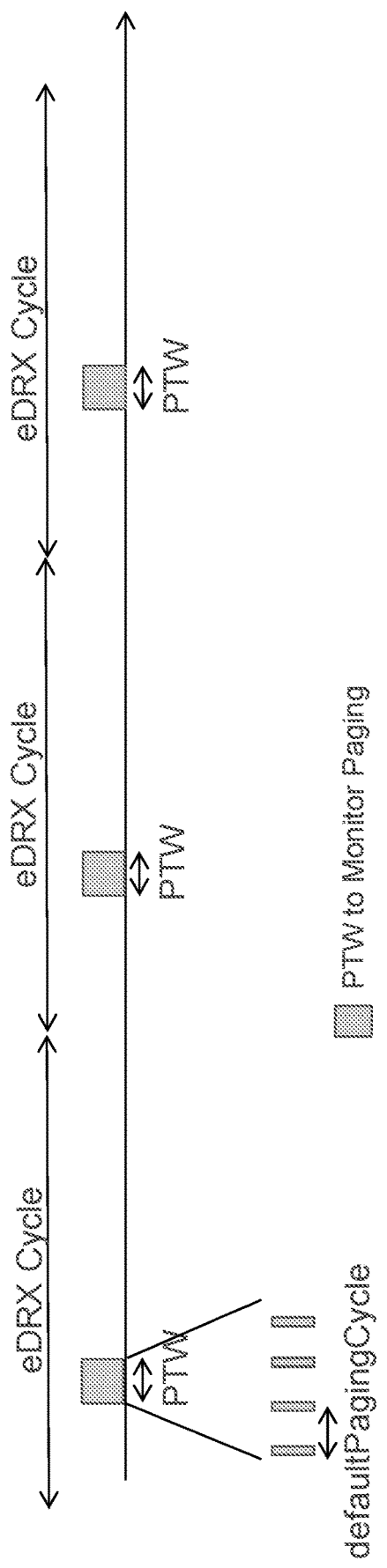
FIG. 11 is a diagram illustrating an example of a UE in extended discontinuous reception, in accordance with certain aspects of the present disclosure.

FIG. 11 illustrates one example timeline of a UE operating while configured in eDRX, in accordance with certain aspects of the present disclosure. As shown, while in eDRX, the UE may monitor one hyper system frame number (SFN) frame per eDRX cycle. The UE may determine the particular hyper SFN frame to monitor based on its international mobile subscriber identity (IMSI). The eDRX cycle can be equal to N hyper frames of 10.24 seconds. For example, the can be equal to (N=1) 10.24 seconds, (N=2) 20.48 seconds, . . . , (N=512) 5242.88 seconds, (N=1024) 10485.76 seconds, etc.

During the monitoring of the hyper SFN frame, the UE may monitor one paging occasion (PO) per defaultPagingCycle during a paging time window (PTW). Such PTW, for example, can be equal to 2.56 seconds, . . . , 40.96 seconds, etc. The PTW may start from SFN mod 1024=0, 256, 512, or 768, where the starting point depends on IMSI. One hyper SFN frame is SFN=0~1023. The UE may request eDRX by including an Extended DRX parameters IE in the TAU Request or Attach request message. Such parameters can include any of the eDRX cycle, PTW, etc.

Example Methods and Apparatus for Avoiding eMBMS

Concurrency With Paging In NB-IOT and eMTC

As noted above, certain wireless networks (e.g., LTE Rel-13 and greater) may introduce support for IoT devices, for example, such as eMTC devices and/or NB-IoT devices. eMTC devices (also referred to as Cat-M1) devices, for example, may support narrowband operations limited to 1.4 MHz (or 6 PRBs) while operating within a wider system bandwidth. NB-IoT devices (also referred to as Cat-NB1) devices may support narrowband operations limited to 180 kHz (or 1 PRB) in one or more deployment modes.

In Release 14, IoT may further be enhanced to support eMBMS for IoT devices, such as eMTC devices and/or NB-IoT devices. While eMBMS services may generally be used in LTE for multimedia services, in eMTC and/or NB-IoT, eMBMS may be used to perform other functions, for example, such as software updates, configuration updates, etc.

Figure 12:
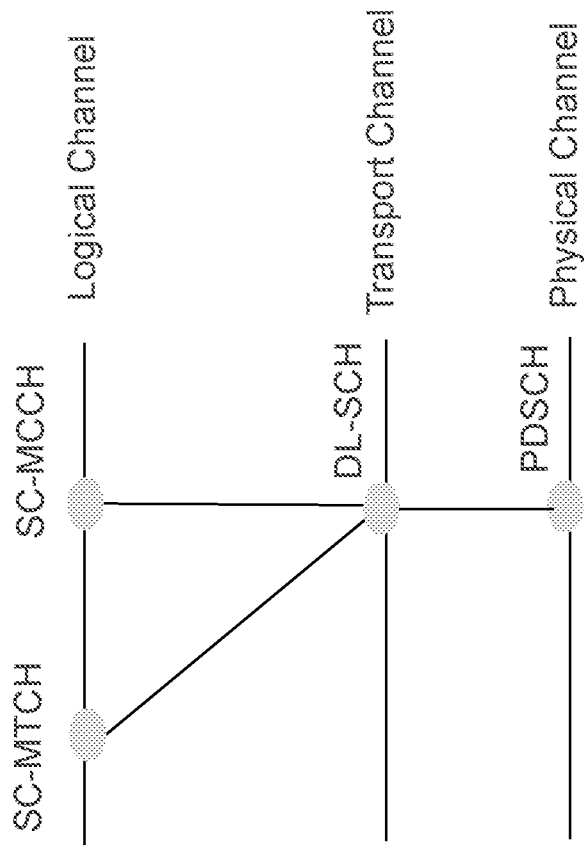
FIG. 12 is a diagram illustrating eMBMS for IoT devices, in accordance with certain aspects of the present disclosure.
Figure 12:
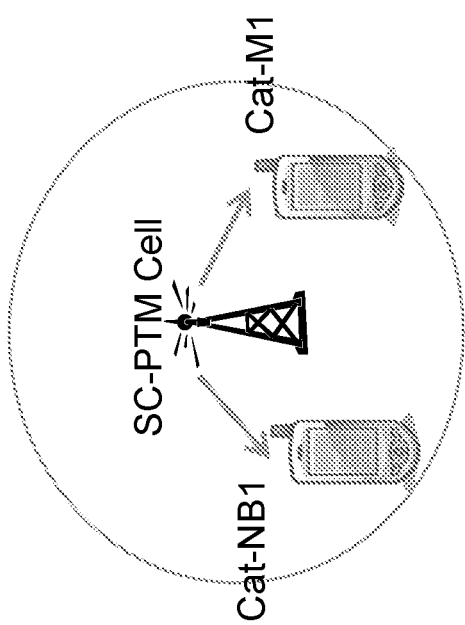

As shown in FIG. 12, a BS (e.g., in Release 14) may be able to multicast data for the eMTC UEs and/or NB-IoT UEs using single cell point to multipoint (SC-PTM) based transmissions. SC-PTM uses the eMBMS system architecture and supports broadcast/multicast services over a single cell. In SC-PTM, data of an eMBMS service is sent on a single cell multicast traffic channel (SC-MTCH)/PDSCH using group specific radio network temporary identifier (G-RNTI). That is, IoT devices (e.g., such as Cat-M1 and/or Cat-NB1) that share a particular G-RNTI may receive multicast data on the SC-MTCH, which is mapped to a downlink shared channel (DL-SCH) and transmitted on PDSCH in unicast subframes. The IoT devices may determine their G-RNTI based on a SC-PTM configuration message, which may be sent via a single cell multicast control channel (SC-MCCH). For example, control information in SC-PTM is generally sent on SC-MCCH, which is mapped to the DL-SCH and sent on the PDSCH.

In some cases, there may be a conflict between receiving eMBMS services from a base station and receiving a paging message from the base station. For example, in some wireless networks (e.g., Rel-14 and greater), IoT devices may have to receive eMBMS service(s) in idle mode and not while in connected mode. At the same time, the IoT devices in idle mode may have to monitor for paging messages from the base station as well.

However, standards generally agree that UEs are not required to search for a paging message and eMBMS grant at the same time. In addition, monitoring for paging messages is given a higher priority than receiving eMBMS service(s). Further, in some cases, if there is mobile originated (MO) signaling (e.g., such as a TAU request message or Attach request message) that the UE has to send, such MO signaling may have a higher priority than receiving eMBMS. Therefore, it would be desirable to provide techniques that can avoid (or reduce) the conflict between the UE receiving eMBMS services from the base station and receiving a paging message from the base station and/or transmitting MO signaling to the BS.

Accordingly, aspects presented herein provide techniques for avoiding the concurrency issue between receiving eMBMS services and receiving paging messages and/or transmitting MO signaling by eMTC devices, NB-IoT devices, etc.

Figure 13:
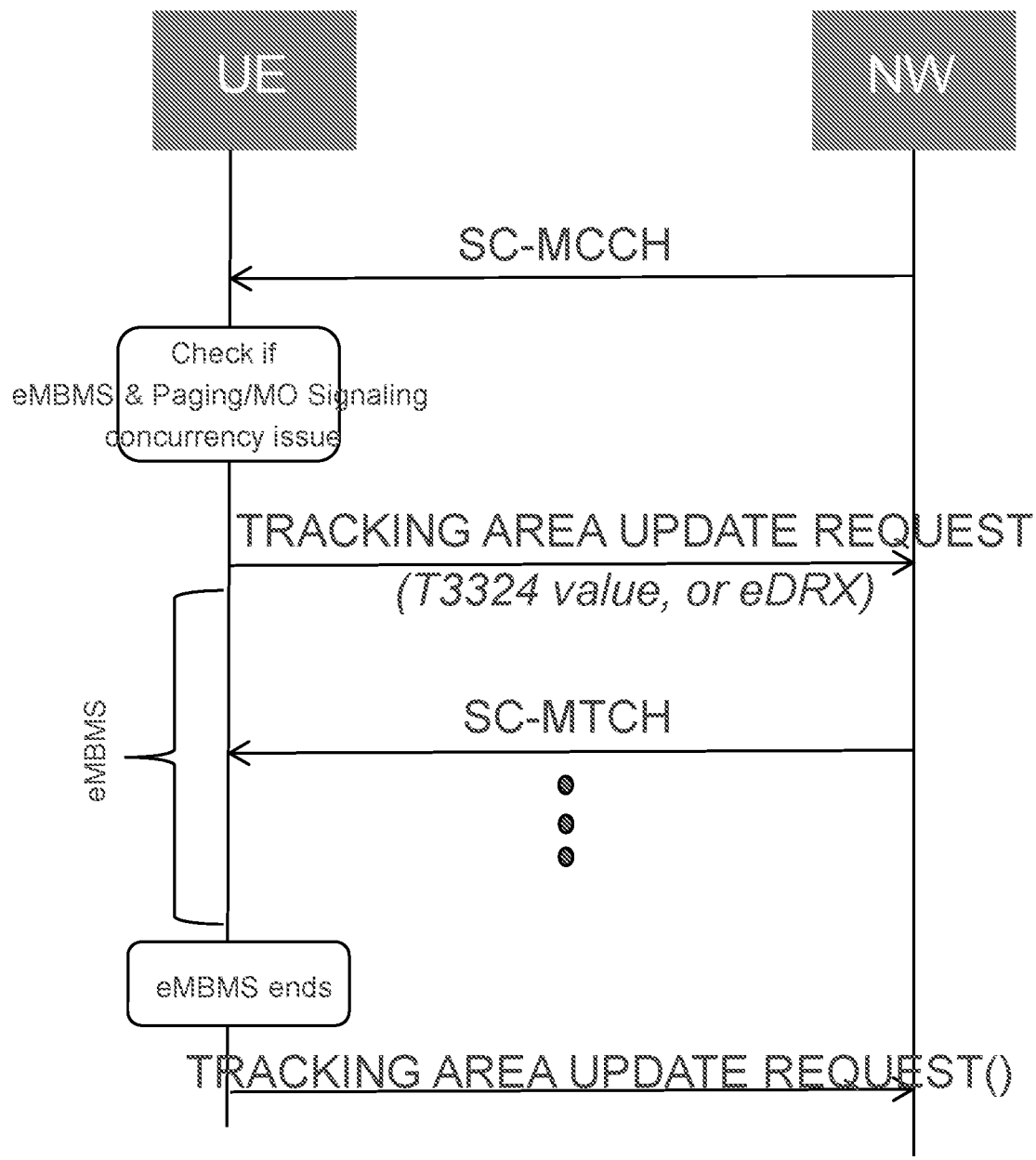
FIG. 13 is a flow diagram illustrating an example of UE avoiding eMBMS concurrency with paging and/or MO signaling operations, in accordance with certain aspects of the present disclosure.

FIG. 13, for example, illustrates one example flow for avoiding eMBMS concurrency with paging in NB-IoT and/or eMTC, in accordance with an aspect of the present disclosure. As shown in FIG. 13, the UE receives a SC-MCCH from the network (e.g., base station). The SC-MCCH may include eMBMS configuration information, which can include identification information for one or more eMBMS services, eMBMS session start and end times, scheduling information for when the one or more EMBMS services are scheduled to be sent from the base station (e.g., during the eMBMS session), etc.

After receiving the SC-MCCH, the UE checks if there is an eMBMS concurrency issue with monitoring for paging messages. Put differently, the UE determines whether the UE cannot receive eMBMS while monitoring for paging messages during the time when the UE is scheduled to receive eMBMS service(s) in idle mode. For example, the UE can check if there will be frequent collision between receiving eMBMS services and monitoring for paging messages. In one aspect, the UE may determine that there is a conflict based on determining that the scheduled time interval for the eMBMS service(s) overlaps with one or more paging occasions for receiving the paging message from the base station.

In one aspect, the UE can also check if there is an eMBMS concurrency issue with MO signaling. Put differently, the UE determines whether there is a conflict between sending a MO signaling message to the base station during the time when the UE is scheduled to receive eMBMS services from the base station. The UE, for example, may have to be in connected mode in order to send the MO signaling message, whereas the UE may have to be in idle mode in order to receive the eMBMS service.

If the UE determines that there is a conflict (e.g., the UE determines it cannot receive eMBMS and paging messages concurrently), the UE can request to use PSM by including T3324 value IE in a TAU (or Attach) Request. The UE may do so in order to avoid monitoring for paging messages in the middle of T3412, which in turn, can minimize (or avoid) the conflict between receiving eMBMS and receiving paging messages and/or transmitting MO signaling. Additionally or alternatively, the UE can request to use eDRX with a sufficiently larger DRX cycle value (in the TAU request message) in order to reduce the conflict between receiving eMBMS and receiving paging messages and/or transmitting MO signaling.

Once the UE completes the eMBMS session, the UE (e.g., as shown in FIG. 13) can change to normal idle mode, e.g., without PSM or without eDRX, by sending another TAU (or attach) message without including a T3324 value IE or extended DRX IE in the TAU message.

In some cases, the eMBMS session may have started by the time the UE determines that a conflict exists (e.g., based on the resource allocation for eMBMS on SC-MCCH). In such cases, performing such a check after the eMBMS session has started can lead to large amount of UEs performing a TAU procedure for a short amount of time, which can overload the system.

Accordingly, aspects presented herein provide techniques that allow the UE to avoid the eMBMS concurrency with paging and/or MO signaling without determining whether a conflict exists.

Figure 14:
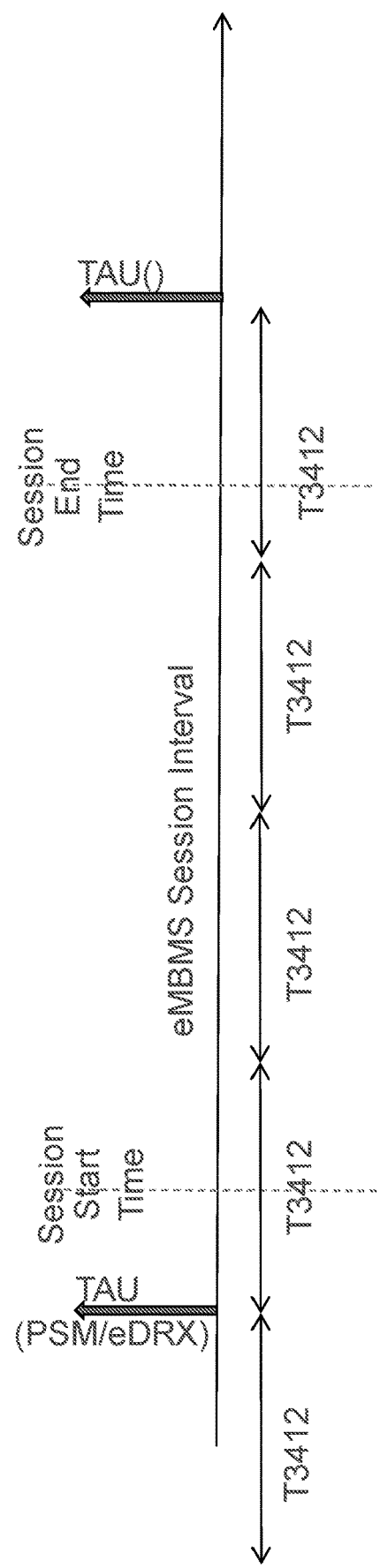
FIGS. 14-15 are diagrams illustrating different examples of a UE avoiding eMBMS concurrency with paging and/or MO signaling operations, in accordance with certain aspects of the present disclosure.

In one aspect, as shown in FIG. 14, the UE may request PSM and/or eDRX in the last TAU procedure, e.g., triggered by T3142, before a start of the eMBMS session. The UE, for example, can request to use PSM and/or eDRX in the last TAU procedure without first checking that a concurrency problem exists by receiving SC-MCCH. Once the eMBMS session ends, the UE can wait for the expiration of the next T3412 timer to initiate another TAU to resume normal idle mode. In one aspect, rather than wait for the expiration of the next T3412 timer, the UE can wait for a random delay after the end of the eMBMS session before triggering a TAU to resume normal idle mode. In one aspect, the session start time and end time may be signaled by user service description (USD) from the base station.

As noted above, in some cases, IoT devices may have a conflict between receiving eMBMS services from the base station (e.g., while in idle mode) and transmitting MO signaling to the base station (e.g., while in connected mode). For example, if the UE is currently in idle mode during an eMBMS session and has to transmit MO signaling, the UE may have to transition to connected mode and stop eMBMS reception in order to transmit the MO signaling (e.g., as MO signaling may have a higher priority than eMBMS).

Accordingly, aspects presented herein provide techniques for avoiding situations where the UE has to transition to connected mode in order to transmit MO signaling at the same time when the UE is scheduled to receive eMBMS services from the base station.

Figure 15:
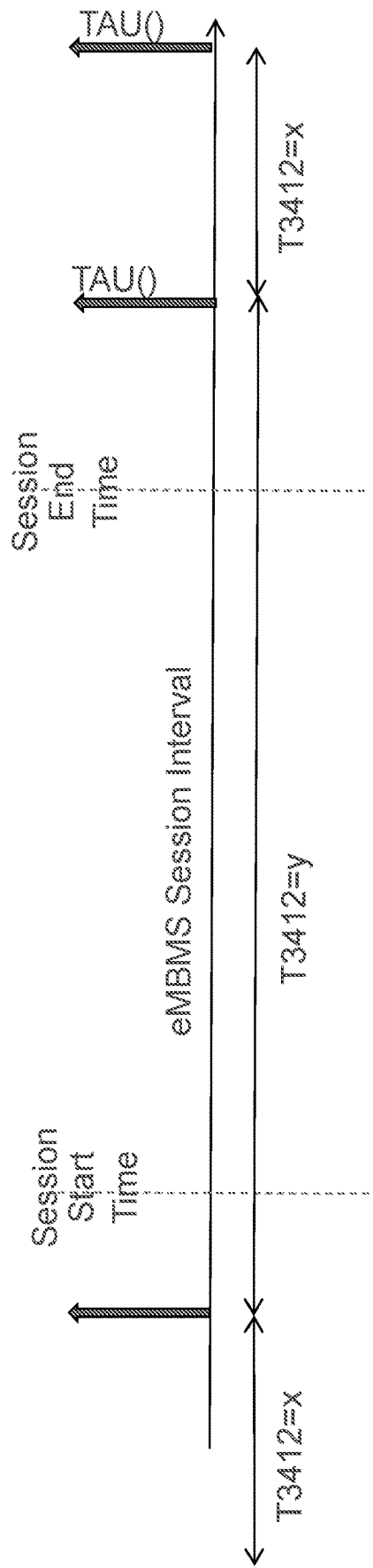

In one aspect, the UE can avoid such a transition during an eMBMS session by requesting a T3412 timer value that lasts for at least a duration of the eMBMS session interval. For example, as shown in FIG. 15, the UE can request in a TAU (prior to the start of the eMBMS session) a T3412 extended value that is larger than the difference between the session start time and the session end time, so that the next TAU can be after the session end time. Once the UE completes the eMBMS session, the UE can change to normal idle mode by using TAU without including the T3412 extended value IE (or requesting the normal T3412 value).

Thus, in the example shown in FIG. 15, the UE may use a normal T3412 extended value equal to x, and prior to the start of the eMBMS session may request a T3412 extended value equal to y. After the end of the eMBMS session, the UE may change back to its normal TAU period by requesting a T3412 extended value equal to x (e.g., after an expiration of T3412=y). In this manner, the UE can avoid transmitting MO signaling during the eMBMS session, and therefore avoid a conflict between receiving eMBMS services and transmitting MO signaling.

Figure 16:
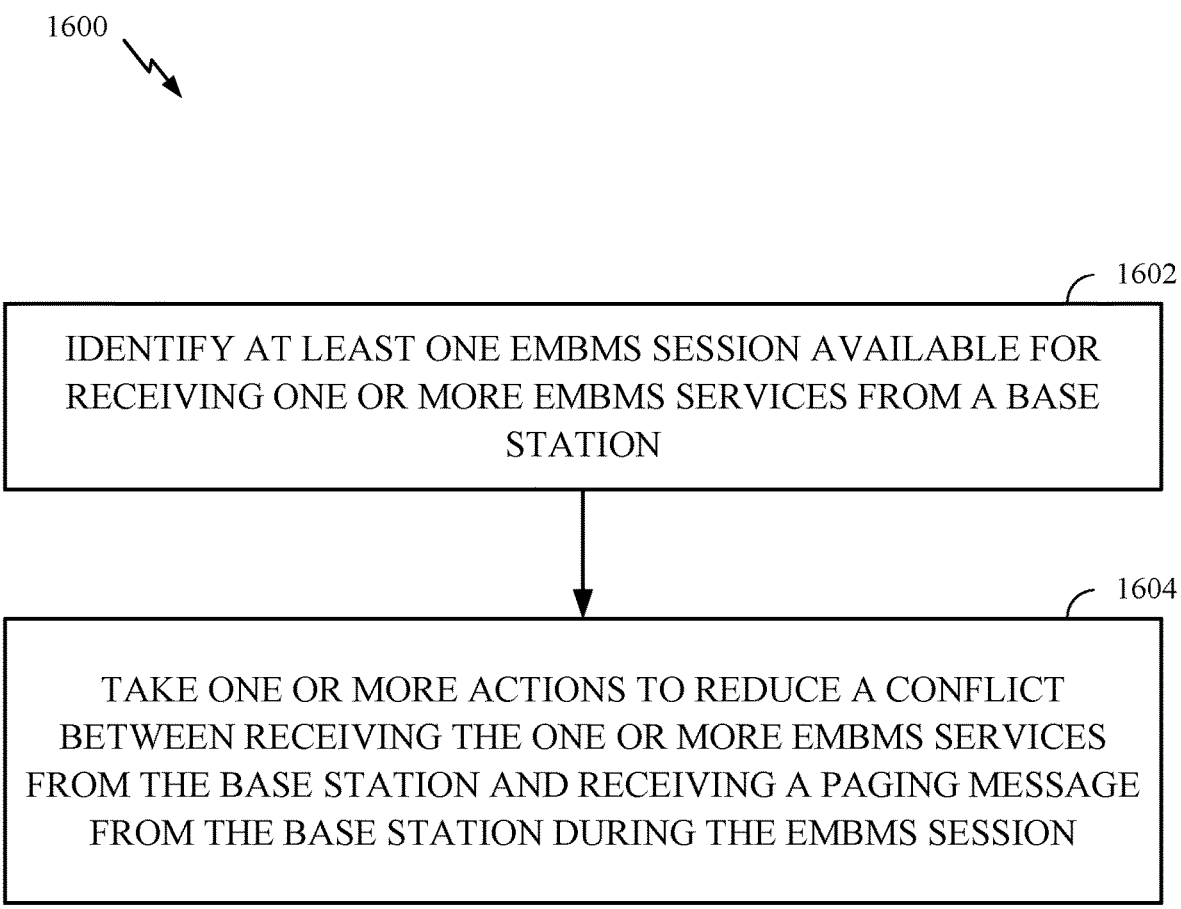
FIG. 16 is a flow diagram illustrating operations performed by a UE, in accordance with certain aspects of the present disclosure.

FIG. 16 is a flow diagram illustrating example operations 1600 for wireless communications, in accordance with certain aspects of the present disclosure. The operations 1600 may be performed, for example, by a user equipment (e.g., NB-IoT device, eMTC device, etc.). The operations 1600 may begin, at 1602, by the UE identifying at least one eMBMS session available for receiving one or more eMBMS services from a base station (e.g., in SC-PTM cell in FIG. 12). At 1604, the UE takes one or more actions to reduce a conflict between receiving the one or more eMBMS services from the base station and receiving a paging message from the base station during the eMBMS session.

In one aspect, taking the one or more actions may include, after detecting the conflict, entering at least one of eDRX or PSM for at least a duration of the eMBMS session, and exiting the at least one of eDRX or PSM after an end of the eMBMS session. For example, as shown in FIG. 13, the UE can receive a SC-MCCH that includes a configuration of the one or more eMBMS services, and determine, based on the configuration, a time interval when the one or more eMBMS services are scheduled to be sent during the eMBMS session. The UE may detect the conflict based on determining that the scheduled time interval for the one or more eMBMS services overlaps with one or more paging occasions for receiving the paging message from the base station.

In one aspect, entering the at least one of the eDRX or PSM may include transmitting to the base station a first message including one or more parameters for changing an interval for monitoring paging messages from the base station during the eMBMS session. For example, with respect to PSM, such parameters can include at least one of a T3324 value IE or T3412 extended value IE. With respect to eDRX, such parameters can include at least one of a eDRX cycle, default paging cycle, etc. The first message may include an Attach request message or TAU request message. In one aspect, exiting the at least one of the eDRX or PSM may include transmitting to the base station a second message without the one or more parameters. The second message may include an Attach request or TAU request message.

In one aspect, as described above with respect to FIG. 14, taking the one or more actions may include determining a starting time of the eMBMS session and an ending time of the eMBMS session. The actions may further include transmitting, prior to the starting time of the eMBMS session, a request to operate in at least one of eDRX or PSM during the eMBMS session. The starting time and ending time may be determined based on a USD signaled from the base station.

In one aspect, as described above with respect to FIG. 15, the UE may also take or more actions to reduce a conflict between receiving the one or more eMBMS services from the base station and transmitting MO signaling during the eMBMS session. Such actions may include transmitting a MO signaling message to operate in PSM for at least a duration of the eMBMS session and refraining from transmitting another MO signaling message during the eMBMS session (e.g., by including a request for T3412 extended value IE that is larger than the duration of the eMBMS session in the MO signaling message). The MO signaling message may include a TAU request, attach request, etc.

Advantageously, the techniques presented herein may allow the UE to receive eMBMS with minimal impacts to monitoring for paging messages from the base station and/or transmitting MO signaling due to TAU.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), detecting, ascertaining, identifying, checking, and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for transmitting, means for receiving, means for sending, means for signaling, means for selecting, means for determining, means for identifying, and/or means for decoding may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   identifying at least one evolved Multimedia Broadcast Multicast Service (eMBMS) session available for receiving one or more eMBMS services from a base station; and
   taking one or more actions to reduce a conflict between receiving the one or more eMBMS services from the base station and receiving a paging message from the base station during the at least one eMBMS session, wherein taking the one or more actions comprises:
      after detecting the conflict, entering at least one of an extended discontinuous reception (eDRX) or power saving mode (PSM) for at least a duration of the at least one eMBMS session; and
      exiting the at least one of the eDRX or the PSM after an end of the at least one eMBMS session.

2. The method of claim 1, further comprising:
   receiving a single cell multicast control channel (SC-MCCH) comprising a configuration of the one or more eMBMS services; and
   determining, based on the configuration, a time interval when the one or more eMBMS services are scheduled to be sent during the at least one eMBMS session.

3. The method of claim 2, wherein the conflict is detected based on determining that the scheduled time interval for the one or more eMBMS services overlaps with one or more paging occasions for receiving the paging message from the base station.

4. The method of claim 1, wherein entering the at least one of the eDRX or the PSM comprises transmitting to the base station a first message comprising one or more parameters for changing an interval for monitoring paging messages from the base station during the at least one eMBMS session.

5. The method of claim 4, wherein exiting the at least one of the eDRX or the PSM comprises transmitting to the base station a second message without the one or more parameters, wherein each of the first message and second messages comprises a tracking area update (TAU) request message or an attach request message.

6. An apparatus for wireless communication, comprising:
   means for identifying at least one evolved Multimedia Broadcast Multicast Service (eMBMS) session available for receiving one or more eMBMS services from a base station; and
   means for taking one or more actions to reduce a conflict between receiving the one or more eMBMS services from the base station and receiving a paging message from the base station during the at least one eMBMS session, wherein means for taking the one or more actions comprises:
      means for entering at least one of an extended discontinuous reception (eDRX) or power saving mode (PSM) for at least a duration of the at least one eMBMS session, after detecting the conflict; and
      means for exiting the at least one of the eDRX or the PSM after an end of the at least one eMBMS session.

7. The apparatus of claim 6, further comprising:
   means for receiving a single cell multicast control channel (SC-MCCH) comprising a configuration of the one or more eMBMS services; and
   means for determining, based on the configuration, a time interval when the one or more eMBMS services are scheduled to be sent during the at least one eMBMS session.

8. The apparatus of claim 7, wherein the conflict is detected based on determining that the scheduled time interval for the one or more eMBMS services overlaps with one or more paging occasions for receiving the paging message from the base station.

9. The apparatus of claim 6, wherein means for entering the at least one of the eDRX or the PSM comprises means for transmitting to the base station a first message comprising one or more parameters for changing an interval for monitoring paging messages from the base station during the at least one eMBMS session.

10. The apparatus of claim 9, wherein means for exiting the at least one of the eDRX or the PSM comprises means for transmitting to the base station a second message without the one or more parameters, wherein each of the first message and second messages comprises a tracking area update (TAU) request message or an attach request message.

11. An apparatus for wireless communication, comprising:
    at least one processor; and
    memory coupled to the at least one processor, the memory including code executable by the at least one processor to cause the apparatus to:
       identify at least one evolved Multimedia Broadcast Multicast Service (eMBMS) session available for receiving one or more eMBMS services from a base station; and
       take one or more actions to reduce a conflict between receiving the one or more eMBMS services from the base station and receiving a paging message from the base station during the at least one eMBMS session, wherein taking the one or more action comprises:
          after detecting the conflict, entering at least one of an extended discontinuous reception (eDRX) or power saving mode (PSM) for at least a duration of the at least one eMBMS session; and
          exiting the at least one of the eDRX or the PSM after an end of the at least one eMBMS session.

12. The apparatus of claim 11, wherein the code is further executable by the at least one processor to cause the apparatus to:
    receive a single cell multicast control channel (SC-MCCH) comprising a configuration of the one or more eMBMS services; and
    determine, based on the configuration, a time interval when the one or more eMBMS services are scheduled to be sent during the at least one eMBMS session.

13. The apparatus of claim 12, wherein the code is further executable by the at least one processor to cause the apparatus to detect the conflict based on determining that the scheduled time interval for the one or more eMBMS services overlaps with one or more paging occasions for receiving the paging message from the base station.

14. The apparatus of claim 11, wherein the code is further executable by the at least one processor to cause the apparatus to enter the at least one of the eDRX or the PSM by transmitting to the base station a first message comprising one or more parameters for changing an interval for monitoring paging messages from the base station during the at least one eMBMS session.

15. The apparatus of claim 14, wherein the code is further executable by the at least one processor to cause the apparatus to exit the at least one of the eDRX or the PSM by transmitting to the base station a second message without the one or more parameters, wherein each of the first message and second messages comprises a tracking area update (TAU) request message or an attach request message.

16. A non-transitory computer-readable medium having computer executable code stored thereon, comprising:
   code for identifying at least one evolved Multimedia Broadcast Multicast Service (eMBMS) session available for receiving one or more eMBMS services from a base station; and
   code for taking one or more actions to reduce a conflict between receiving the one or more eMBMS services from the base station and receiving a paging message from the base station during the at least one eMBMS session, wherein the code for taking the one or more actions comprises:
      code for entering at least one of an extended discontinuous reception (eDRX) or power saving mode (PSM) for at least a duration of the at least one eMBMS session, after detecting the conflict; and
      code for exiting the at least one of the eDRX or the PSM after an end of the at least one eMBMS session.

17. The non-transitory computer-readable medium of claim 16, further comprising:
   code for receiving a single cell multicast control channel (SC-MCCH) comprising a configuration of the one or more eMBMS services; and
   code for determining, based on the configuration, a time interval when the one or more eMBMS services are scheduled to be sent during the at least one eMBMS session.

18. The non-transitory computer-readable medium of claim 17, wherein the conflict is detected based on determining that the scheduled time interval for the one or more eMBMS services overlaps with one or more paging occasions for receiving the paging message from the base station.

19. The non-transitory computer-readable medium of claim 16, wherein the code for entering the at least one of the eDRX or the PSM comprises code for transmitting to the base station a first message comprising one or more parameters for changing an interval for monitoring paging messages from the base station during the at least one eMBMS session.

20. The non-transitory computer-readable medium of claim 19, wherein the code for exiting the at least one of the eDRX or the PSM comprises code for transmitting to the base station a second message without the one or more parameters, wherein each of the first message and second messages comprises a tracking area update (TAU) request message or an attach request message.

* * * * *